United States Patent [19]
Steinberg et al.

[11] Patent Number: 5,790,622
[45] Date of Patent: Aug. 4, 1998

[54] FUEL ROD HAVING PREDETERMINED SECONDARY DAMAGE

[75] Inventors: Eckard Steinberg, Erlangen; Alwin Schaa, Duisburg, both of Germany

[73] Assignee: Siemens Aktiengesellschaft, Munich, Germany

[21] Appl. No.: 554,566

[22] Filed: Nov. 6, 1995

[30] Foreign Application Priority Data

May 4, 1993 [DE] Germany .................. 43 14 708.9

[51] Int. Cl.$^6$ .................................................. G21C 3/06
[52] U.S. Cl. .................................................. 376/450; 376/456
[58] Field of Search ................................ 376/450, 456, 376/457

[56] References Cited

U.S. PATENT DOCUMENTS

| | | | |
|---|---|---|---|
| 3,235,466 | 2/1966 | Williams et al. | 376/450 |
| 3,886,037 | 5/1975 | Schlenker | 376/450 |
| 4,200,492 | 4/1980 | Armijo et al. | 376/417 |
| 4,372,817 | 2/1983 | Armijo et al. | 376/417 |
| 5,023,048 | 6/1991 | Mardon et al. | 376/416 |
| 5,539,791 | 7/1996 | Garzarolli et al. | 376/457 |

FOREIGN PATENT DOCUMENTS

| | | |
|---|---|---|
| 0121204 | 10/1984 | European Pat. Off. . |
| 0170943 | 2/1986 | European Pat. Off. . |
| 9206038 | 8/1992 | Germany . |
| 4218023 | 12/1993 | Germany . |

OTHER PUBLICATIONS

Patent Abstracts of Japan, vol. 3, No. 122 [M-75] Oct. 13, 1979 & JP-A-54-99897 (Tokyo) Jul. 8, 1979.

*Primary Examiner*—Daniel D. Wasil
*Attorney, Agent, or Firm*—Herbert L. Lerner; Laurence A. Greenberg

[57] ABSTRACT

In order to avoid uncontrolled secondary damage to a fuel rod, in particular a fuel rod being formed of Zircaloy and having a liner on the inside, in which the secondary damage may be generated by coolant that enters the fuel rod in the event of primary damage, a nucleus is deliberately provided in a cladding tube. The nucleus, although passivated in an undamaged fuel rod and not impeding the serviceability of the fuel rod, is activated by coolant which enters the fuel rod in the event of primary damage or by hydrogen or other reaction products produced in reactions of the coolant in the interior of the fuel rod and results in a small-area perforation. This prevents an aggressive atmosphere, which may result in unintentional large-area secondary damage at other points, from accumulating in the cladding tube after primary damage.

38 Claims, 13 Drawing Sheets

FUEL ROD HAVING PREDETERMINED SECONDARY DAMAGE

CROSS-REFERENCE TO RELATED APPLICATION

This application is a Continuation of International Application Serial No. PCT/DE94/00503, filed May 4, 1994.

BACKGROUND OF THE INVENTION

1. Field of the Invention

The invention relates to a fuel rod for a boiling-water fuel assembly including a sealed cladding tube having a coolant-free interior containing at least oxidizable nuclear fuel and having a cladding-tube wall with an inner surface which is formed of a metallurgically applied metal (for example, a Zr—Fe alloy) that is as corrosion-resistant as possible to conditions in the interior during the operation of the reactor and which, if possible, does not alter even in the presence of gaseous hydrogen. At least an outer surface of the cladding tube is formed of a metal (for example, Zircaloy) which is as corrosion-resistant as possible to conditions in the boiling water during the operation of the reactor.

The invention generally relates to a nuclear-reactor fuel assembly being cooled by a coolant during the operation of the nuclear reactor and including a fuel rod having a sealed cladding tube with an interior enclosing at least the nuclear fuel, and as a rule also an inert-gas filling (for example, helium) after manufacture in order to already generate a certain internal pressure in a new fuel rod to compensate partially for external pressure prevailing in the coolant. Usually, the fuel is predominantly formed of still oxidizable material (for example, uranium oxide $UO_2$ or $U_2O_3$) and releases nitrogen, iodine and other fission products during the operation of the reactor, as a result of which the composition and pressure of the cladding-tube filling is altered.

The cladding tubes of the fuel rods are constructed for the normal operating conditions of the reactor, that is to say, for example, mechanical, thermal and chemical stressing, in such a way that they withstand as long a service life as possible in the reactor under normal operating conditions, if possible without damage.

At the same time, lighter damage occurring during the operation can frequently be tolerated and at most results in the fuel rods being replaced during the next inspection. Cladding tubes which exhibit only a slight susceptibility to such minor damage also permit long intervals between such maintenance operations.

However, more serious damage which requires an immediate shutdown of the reactor may also occur. If the causes of such damage are known, attempts will already be made to deal with them. However, if the cause is only light primary damage which in itself does not as yet require a far-reaching intervention in the operation of the reactor, the possible extent of the secondary damage can be limited by additional measures, especially since such primary damage can hardly be eliminated completely.

Similar safety measures are customary. Thus, for example, for the case of a pressure drop in the coolant, which may arise in the event of primary damage in other parts of the reactor, there has been talk of avoiding a swelling of the cladding tubes, which are under considerable internal pressure, by providing in the cladding tube a predetermined breaking point or an automatic safety valve which opens in the event of a predetermined pressure difference between the inside and the outside being exceeded and brings about a pressure equalization. Swollen cladding tubes would, after all, interfere with the emergency cooling which is necessary in the case of such primary damage, with the result that serious consequential damage could occur.

The invention provides, so to speak, a similar "automatic hydrogen safety valve" which is closed during normal operation or even also in the case of minor but unavoidable primary damage, as a result of which coolant enters the interior of the fuel rod, and which does not adversely affect the serviceability of the fuel rod, but which opens automatically as soon as the concentration of hydrogen (more precisely, the partial pressure $p(H_2)$ of the hydrogen) reaches a critical value that threatens to destroy the entire cladding tube.

Special zirconium alloys (in particular, Zircaloy 2 and Zircaloy 4) have been developed as material for cladding tubes, for the conditions in light-water-cooled nuclear reactors. In that connection, cladding tubes formed of Zircaloy 2 having an inner surface to which an internal lining ("liner") formed of technically pure zirconium is metallurgically bound (U.S. Pat. No. 4,372,817 and U.S. Pat. No. 4,200,492) have proved successful for boiling-water reactors. Zircaloy 2 is regarded as sufficiently resistant to corrosion by the coolant (external corrosion) for the outer surface, which is formed by a thick matrix of the cladding tube. On the inside, however, the liner forms a barrier to fission products which may be produced in the interior of the cladding tube and which may attack the Zircaloy that forms the supporting layer (matrix) including the outer surface of the cladding tube.

The liner is also chemically insensitive to contact with the fuel itself which, as a rule, has a porous structure and tends to increase substantially in volume in the course of the operation of the reactor. Fuel pellets, in particular, become brittle as a result of this change in volume and the internal stresses which occur during this process. Fragments of the pellets may therefore make contact with the inner surface of the cladding tube and result in stresses in the latter which are smoothed out in the ductile zirconium liner but, in the case of cladding tubes without a liner, may initiate the dreaded stress-corrosion cracking which results in long cracks and bursts in the cladding tube. In that connection, "corrosion" is understood as meaning not only oxidation (reaction with oxygen), but also erosion and other chemical destruction which occurs at the inner wall of the cladding tube. However, zirconium corrodes more readily than Zircaloy in water and steam, if they enter as a result of primary damage. With a view thereto and to a slower absorption of hydrogen and delayed formation of hydride, lightly doped zirconium alloys, in particular a Zr—Fe alloy, have therefore been developed as a material for liners (German Utility Model U 92 06 038.2, corresponding to Published International Application WO 93 17 137).

Conversely, for pressurized water reactors, because of the somewhat different chemical and physical corrosion conditions in the cooling water and because of the higher surface temperatures, cladding tubes are frequently used which have a matrix that is formed of Zircaloy 4, that forms the inner surface and is regarded as sufficiently resistant to the corrosive processes and stresses at the inner surface of the cladding tube, whereas the outer surface is protected by a thin, metallurgically applied external layer against the corrosion conditions in the coolant, in particular an increased uniform corrosion which occurs especially in the case of radiation stress (so-called "duplex" cladding tubes).

Fuel rods of boiling-water reactors are primarily considered below. However, the principles and technical measures developed in that connection can largely be extrapolated to pressurized water reactors as well. The invention is therefore not restricted to the measures described in detail for boiling-water fuel rods.

SUMMARY OF THE INVENTION

It is accordingly an object of the invention to provide a fuel rod having predetermined secondary damage, which overcomes the hereinafore-mentioned disadvantages of the heretofore-known devices of this general type and which protects the cladding tubes of light-water-cooled nuclear reactors at least against fairly heavy damage, such as extended holes or cracks. In particular, the intention is to limit the consequence of small-area primary damage, which results in minor holes in the cladding tube. As a result, it is possible to extend the service life of the fuel rods in the cladding tube and to render an immediate replacement of damaged cladding tubes unnecessary even if the tubes already have slight primary damage which has resulted in a penetration of coolant into the interior of the cladding tube.

In the cladding tubes mentioned at the outset and having a thin ductile internal layer, the frequency of primary damage produced by stresses at the inner surface of the cladding tube are already considerably reduced.

Experience has shown that cladding tubes may also be damaged from the outside. That primary damage is also usually very small in area and it often has mechanical causes. Thus, sharp-edged foreign bodies may get caught in the spacers of fuel assemblies and be caused to vibrate intensely by the coolant flowing past at high speed. Under those circumstances, the foreign body may damage the cladding-tube wall until a perforation is produced ("fretting" damage).

Such small damage is frequently detected only after a fairly long time since only a small amount of water (coolant) penetrates through it into the cladding tube or only a small amount of radioactive substances can get out of the interior of the cladding tube into the coolant. It is therefore not critical if the damaged fuel rods still remain in the hot core of the reactor for a certain time.

A liner formed of pure zirconium is more susceptible to corrosion in water and steam than Zircaloy. If primary damage is not completely eliminated and water vapor therefore enters such a cladding tube, more severe corrosion may occur than in the case of homogeneous cladding tubes formed of Zircaloy. For this reason, it has already been proposed to manufacture the liner from zirconium to which up to 1 per cent by weight of tin has been added by alloying to improve corrosion resistance (Published European Patent Application 0 121 204 B1).

In the case of oxidation by water or steam, gaseous hydrogen is produced which may penetrate into the cladding-tube material and which may result in material alterations and in embrittlement therein as a consequence of hydride precipitates. The oxide layer of the Zircaloy is a comparatively good diffusion barrier per se, whereas liners formed of pure or lightly doped zirconium exhibit a more rapid hydride formation, despite having a thicker oxide layer. On the other hand, the liner specified at the outset and formed of zirconium containing 0.2 to 0.8 per cent by weight of iron is advantageous since it combines the high ductility of the zirconium liner with the high corrosion resistance of the Zircaloy and an even weaker hydride formation.

The amount of primary damage, insofar as it is caused by stress-corrosion cracking, is thereby already considerably reduced and the risk of secondary damage is simultaneously decreased.

Such secondary damage is comparatively rare, but may be much more serious. It is extensive destruction of the cladding tube which results in the above-mentioned liberation of radioactive substances and impurities. Cracks have been observed which have a length of several meters and have extended virtually over the entire length of the fuel rod. A single crack of that type may have the result of causing the reactor to be shut down in order to replace the fuel rod.

In the manufacture of cladding tubes it is important, first of all, that, if possible, the cladding tube does not contain any nuclei at which holes which may grow through the entire wall of the cladding tube can form under the physical and chemical conditions to which the outer surface and the inner surface of the cladding tube are each exposed.

With the foregoing and other objects in view there is provided, in accordance with the invention, a fuel rod for a boiling-water fuel assembly, comprising a sealed cladding tube including a coolant-free interior containing at least oxidizable nuclear fuel; a cladding-tube wall having an inner surface formed of a metallurgically applied metal being as corrosion-resistant as possible to conditions in the interior during operation of a reactor and as little subject to change as possible even in the presence of hydrogen; an outer surface being formed of a material being corrosion-resistant to conditions in boiling water during operation of the reactor; and a nucleus to be activated by gaseous hydrogen for forming a hole penetrating the cladding tube.

However, especially in the case of a liner cladding tube of the type specified at the outset, the invention provides a nucleus which can be activated by gaseous hydrogen in the interior of the cladding tube and results in a controlled manner in the formation of a hole which penetrates the cladding tube.

With the objects of the invention in view, there is also provided a fuel rod for a fuel assembly being cooled by a coolant, in particular light water, during operation of a nuclear reactor, comprising a sealed cladding tube including a coolant-free interior containing at least nuclear fuel; an inner surface being formed of a material being corrosion-resistant to conditions in the interior during operation of a reactor; an outer surface being formed of a material being corrosion-resistant to conditions in a coolant during operation of the reactor; and a nucleus for forming a hole penetrating the cladding tube, the nucleus not being activatable from outside by the coolant and from inside by conditions in the interior with an undamaged cladding tube and under operating conditions of the nuclear reactor, but being activatable as soon as coolant has entered the interior of the cladding tube through damage to the cladding tube.

At the same time, the outer surface of the cladding tube is formed of a metal which is protected against corrosion by the coolant and its inner surface is formed of a material which is resistant to destruction originating from the inside. A nucleus for forming a hole which penetrates the cladding tube is provided at or in the cladding tube. The nucleus is not activatable from the outside of the cladding tube by the coolant and from the inside of the cladding tube by the substances enclosed by the cladding tube under normal operating conditions, but is activated as soon as coolant has entered the interior of the cladding tube.

The studies now available on cladding tubes with large-area damage and experiments on simulating such damage to tubes or other test bodies inside and outside the reactor yield some exceptional findings.

Thus, only about 20% of the cladding tubes having primary damage also exhibit serious secondary damage.

Among those, the closure caps at the upper end are frequently corroded away or blown off, which could be explained by large-area corrosion nuclei that are unintentionally generated during welding and are activated by the coolant. Comparatively solid caps having correspondingly strong, carefully executed welding seams are therefore used.

The large-area damage often originates from a defect ("nucleus") which is situated substantially above the lower fuel rod.

The large-area damage, which is regarded as consequential damage (secondary damage) of the primary damage, is generally crack-like, that is to say it extends along a line, and the stresses in the cladding tube are regarded as its cause. However, those lines may also extend helically around the axis of the fuel rod. That could be interpreted as the consequence of a multiaxial stress.

The secondary damage occurs in a region in which the Zircaloy or the zirconium is embrittled by hydrogen and/or hydride precipitates. In that case, the hydrogen may be produced mainly as oxidation hydrogen which is released from the water during the oxidation of the Zircaloy. In general, however, only comparatively thin oxidation layers are detectable at the inner surface of the Zircaloy, so that only a relatively small amount of hydrogen can be released during their formation, but at the same time the oxidation layer itself additionally forms a diffusion barrier for the hydrogen and the support material of the cladding tube ought to provide passivation with respect to the corrosion by hydrogen. Further hydrogen could be produced by oxidation of the fuel and by radiolysis.

The majority of the liner cladding tubes with primary damage do not exhibit any fairly large secondary damage. Despite the increased corrosion of zirconium (compared with Zircaloy), the growing oxide layer obviously protects the liner adequately. However, the greatest secondary damage has been observed in the case of cladding tubes having a liner formed of pure zirconium. That circumstance has to be borne in mind particularly in the development of suitable liner materials and has resulted in the development of the Zr—0.2 . . . 0.8 Fe alloy mentioned above.

The invention takes into account the fact that the water (coolant) which has entered through the primary damage results in an atmosphere there that does not immediately attack and destroy the material at the inner surface of the cladding tube, but changes slowly until a critical state is reached in which a corrosion nucleus that has not previously been active is activated and under those conditions results in a rapidly growing crack or hole.

Such a critical state may arise, for example, if water which has penetrated reacts with the fuel and results in a high partial pressure of hydrogen at which the hydrogen can diffuse into the cladding-tube wall (especially if a passivating oxide layer at the inner surface of the cladding tube is locally damaged by interaction with the fuel). Under those circumstances, the hydrogen which has diffused in may accumulate at any imperfection in the material of the cladding tube, for example a scratch or another structural disturbance which may also be situated on the outside of the cladding tube, particularly if the disturbance is relatively extensive. Finally, a stress crack may form as a result of material embrittlement and the imperfection has therefore acted as a nucleus for the formation of the hole. That nucleus was activated by hydrogen.

According to the invention, a nucleus, preferably an almost punctiform or small-area nucleus, which can, however, only be activated by the water (coolant) which has penetrated, that is to say only after primary damage, and results in a corresponding hole, is now deliberately provided in the cladding tube.

Upon interacting with the primary damage, this induced hole then makes it possible for the atmosphere in the interior of the cladding tube to be continuously replaced by a suitable atmosphere containing coolant before a critical state can build up.

In accordance with a further feature of the invention, it is advantageous to provide the nucleus near the upper end or, at any rate, above the region in which the small-area primary damage is found in the majority of the damaged fuel rods having been examined.

In accordance with an added feature of the invention, a position on the cladding tube which is situated above or below the region containing the fuel is suitable for the nucleus. The cladding tube is exposed only to fairly low thermal loadings at this position and there is consequently a particularly low risk that even primary damage could be produced by the nucleus.

In accordance with an additional feature of the invention, it also proves adequate to provide such nuclei only at the lower end of the cladding tube, that is to say in the general vicinity of the primary damage, provided the latter should preferably occur there. It could otherwise be advantageous to provide such nuclei at both ends.

An understanding as to which chemical and physical processes result in the development of the extensive secondary damage after water has penetrated into the cladding tube has not been completely clarified at present. The following figures, experiments and considerations assume that hydrogen, in particular, is involved in this process, and the hydrogen forms in fairly large quantities as a result of the reaction of water which has penetrated with the oxidizable hot fuel, and results in a dry $H_2$ atmosphere in the cladding tube.

The formation of the corrosion nucleus being specifically proposed is adapted to these ideas about the corrosive atmosphere which occurs after primary damage in such a way that the atmosphere results in corrosion originating from the nucleus and a corresponding small-area hole which prevents further aggravation of the damage conditions in the interior of the cladding tube.

Further or other possibilities relating to the way in which such a corrosion nucleus can be developed or generated may arise if the mechanism leading to the large-area secondary damage is more precisely known. In this connection, the following conditions have to be observed:

a) The cladding tube is as resistant as possible to the normal operating conditions when it is intact, that is to say at least corrosion-resistant to the conditions existing at the outer surface in the coolant and to the conditions existing at the inner surface (including the chemical and thermal loadings and the interactions between the fuel and the cladding tube, so-called "pellet cladding interaction"). At the same time, the cladding tube is also preferably as resistant as possible to destruction which may occur if liquid coolant and/or an atmosphere substantially saturated with coolant vapor is present in the interior of the cladding tube. As has already been mentioned, in the case of boiling-water fuel assemblies, a cladding tube formed of Zircaloy and having a metallurgically bound internal lining formed of Zr—Fe is particularly advantageous.

b) A nucleus is provided in the cladding tube which induces a hole in the cladding tube only after coolant has penetrated through damage in the cladding tube, with the nucleus being capable of easily being activated by the coolant that has penetrated or its reaction products and resulting in a hole, before aggravated conditions can develop in the cladding tube, which generate uncontrolled damage at other irregularities in the cladding tube (welding seams, structural defects, scratches) which may also act as unintentional nuclei for the formation of damage and can be activated by the aggravated conditions.

The cladding tube is therefore not prone to secondary damage outside the nucleus that is intentionally provided, provided that the enclosed atmosphere does not alter as a result of the accumulation of reaction products of the coolant which has penetrated but is replenished by the replacement of the liquid and/or gaseous reaction products produced with newly entering coolant. Under these circumstances, it is quite tolerable to a certain extent that the inner surface of the cladding tube is susceptible to oxidation by the coolant provided a protective layer forms on the inner surface as a result and protects the cladding tube against further attack by the coolant itself. An increased resistance to reaction products of the coolant (for example, hydrogen), does not, on the other hand, have to be absolutely required of the inner surface of the cladding tube. After all, the induced hole makes possible the removal of the reaction products being produced, which do not therefore accumulate in the interior and do not reach dangerous concentrations.

Other features which are considered as characteristic for the invention are set forth in the appended claims.

Although the invention is illustrated and described herein as embodied in a fuel rod having predetermined secondary damage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
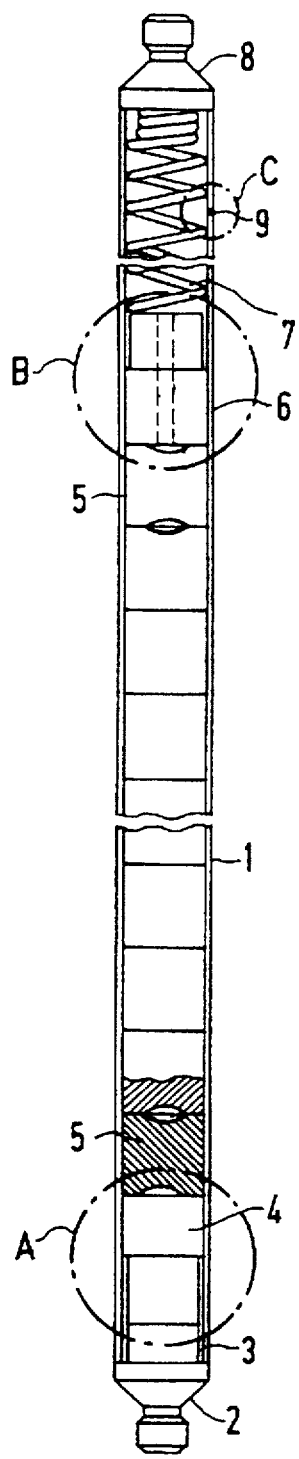
FIG. 1 is a fragmentary, diagrammatic, partly broken-away, longitudinal-sectional view through an intact fuel rod according to the invention.

Referring now to the figures of the drawing in detail and first, particularly, to FIG. 1 thereof, there is seen a fuel rod which includes a cladding tube 1, in particular a Zircaloy tube, having a lower end which is sealed with a lower end cap 2. The end cap carries a supporting body 3 for supporting an end stopper 4 on which a column of pellets 5 is disposed.

The cylindrical pellets 5 are formed substantially of uranium dioxide, which can be converted in the presence of water vapor at fairly high temperature into higher oxidation levels ($U_3O_8$, $UO_3$) with the development of $H_2$. Their cylindrical diameter is approximately 0.4 mm less than the internal diameter of the cladding tube 1, with the result that a gap is produced between the pellets and an inner surface of the cladding tube 1, into which gap a fresh pellet can expand as soon as it begins to swell as a consequence of the action of radiation during the operation of the reactor. However, the volume formed between the pellet column and the cladding tube is very small.

The pellet column is terminated at the top by an upper end stopper 6 which is braced through the use of a spring 7 against an end cap 8 terminating the upper end of the cladding tube. This produces a free volume into which fission products produced by the nuclear processes during the operation of the reactor can escape and accumulate through a suitable bore in the upper end stopper 6. A nucleus, seed, germ or crystal 9 provided according to the invention may advantageously be disposed in a part of the upper end of the fuel rod in which the fuel rod does not contain any fuel, for example at a point or location C at the gas collecting space which is kept free by the spring.

In a region A, the lower end stopper 4 can be held tightly against the cladding tube 1 by shrinking-on or in another way, as is described in German Published, Non-Prosecuted Patent Application DE 42 18 023 A1, which also discloses the structure of a region B with the upper end stopper and the spring.

The hydrogen of reaction, which is produced in the cladding tube from the water which has penetrated after primary damage and results in hydride particles precipitating in the outermost layer of the Zircaloy, appears to be responsible for the damage to the cladding-tube material. The hydride particles can be detected as a hydride fringe in the microsection.

Figure 2:
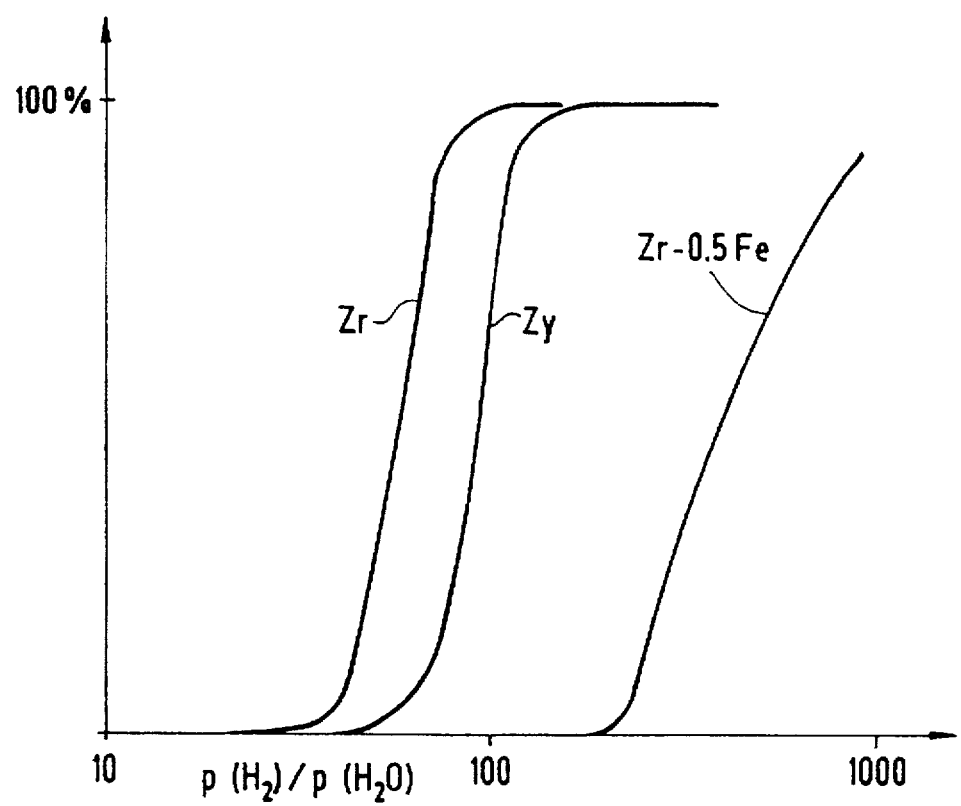
FIG. 2 is a diagram showing growth of a zone enriched with hydride for various surfaces exposed to hydrogen and water vapor.

Within three days, only a narrow hydride fringe forms in relatively dry hydrogen, for example at a partial pressure of $p(H_2):p(H_2O)=40$, but at pressure ratios of $p(H_2):p(H_2O) =180$, it increases to a value of about 230 µm, in all cases at temperatures of 350° C. and pressures of 100 bar (curve "Zy" in FIG. 2). The hydride fringe finally reaches a limiting value which is set by the volume of the coreactants.

The growth of the relative thickness (referred to the limiting value) starts in the case of virtually pure zirconium (curve "Zr") even in a moist atmosphere and reaches the maximum value even for $p(H_2):p(H_2O)$=approximately 90. Pure zirconium will thus not only corrode more rapidly than a homogeneous Zircaloy cladding tube if water penetrates into its interior, but is also prone to more rapid embrittlement as a result of hydride formation.

However, although the Zr liner is useful for preventing primary damage, hydrogenation and a risk of rupture may worsen as soon as water has entered the cladding tube. If, however, 0.5% of iron is added to the pure zirconium by alloying, a curve "Zr—0.5 Fe" in FIG. 2 is produced. This beneficial material is therefore already well suited to avoiding secondary damage both with regard to its cause (primary damage) as well as with regard to corrosion resistance.

Figure 3:
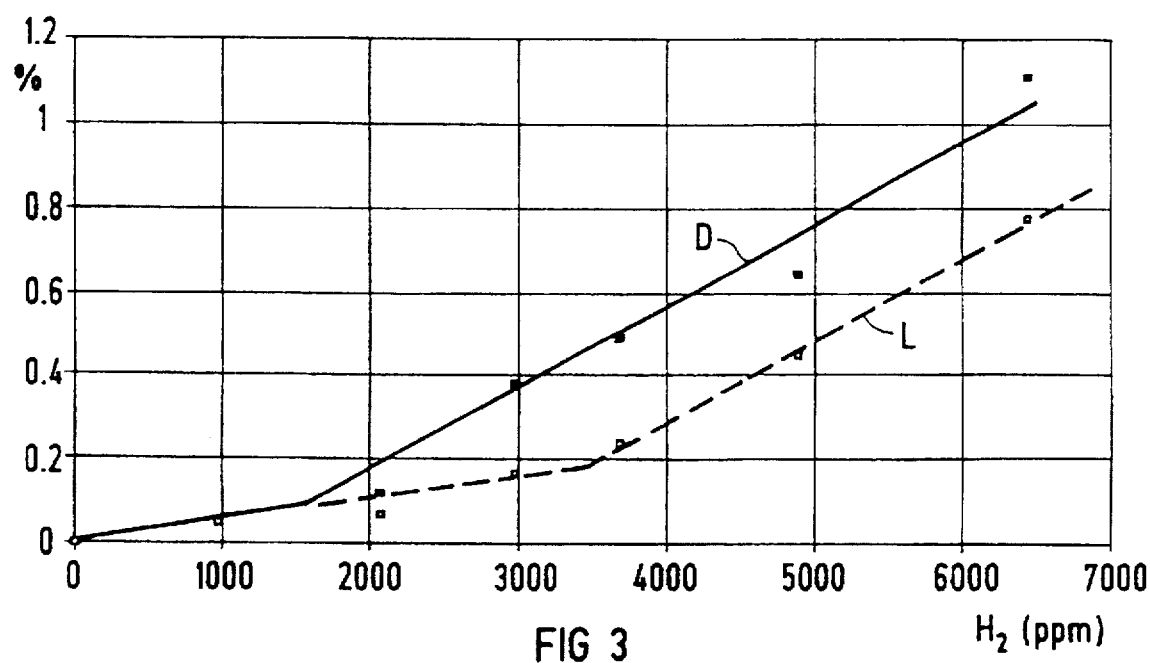
FIG. 3 is a diagram showing a percentage change in length and diameter of a tube as a result of an absorption of hydrogen.

The hydrogenation brings about an increase in volume in the metal and therefore internal stresses in the latter. This is indicated in FIG. 3, where the relative change in the length L and the diameter D is shown as a function of the $H_2$ content of the material of a Zircaloy rod. Consequently, this results in substantial stresses in the cladding tube as soon as the hydrogen concentration in the metal exceeds the solubility limit and hydrides precipitate.

Figure 4:
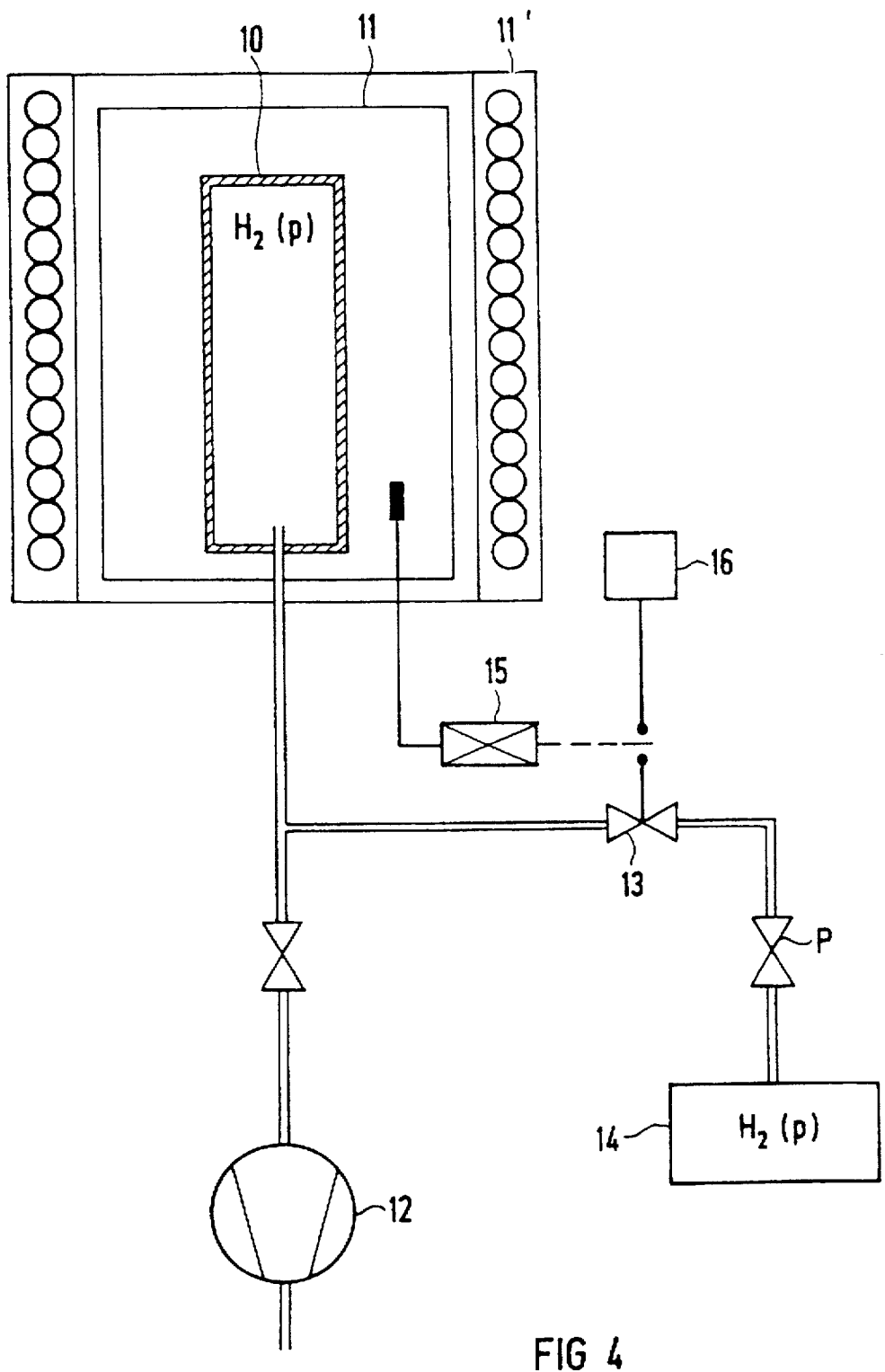
FIG. 4 is a diagrammatic and schematic view of an experimental configuration for simulating a mechanism in a laboratory in the formation of large-area secondary damage.

The fact that these processes may result in the complete destruction of a tube can be simulated in FIG. 4 by a sample tube 10 in a container 11 which is kept at a specified temperature by a furnace 11'. The sample tube 10 is first evacuated through the use of a pump 12 in order to prevent a passivation of the inner surface of the tube section by an oxide layer. Gaseous hydrogen having a specified pressure p (regulated by a reducing valve P) is then introduced into the sample tube 10 from a hydrogen reservoir 14 through a valve 13. If, during this process, overpressure with respect to the pressure (for example normal pressure) in the interior of the container 11 is generated in the internal volume of the sample tube, a pressure sensor 15 can detect when the wall of the sample tube is destroyed by corrosion, and a pressure rise occurs in the container 11. In the event of a leak, a sensor signal shuts off the hydrogen supply and stops a timer 16 which was started when the valve 13 was opened. The sample tube is then examined for damage.

While those surfaces of the Zircaloy tubes which are exposed to the water of the nuclear reactor are only coated with a fairly thick oxide layer after several operating cycles of the reactor and the time until the Zircaloy wall has been corroded through is many years even with hot water vapor, this time is shortened in the case of hydrogen in the experiment mentioned above to between several days and a few hours, depending on the respective test temperature. It only lengthens if water vapor is added to the hydrogen since the formation of the hydride layer on the surface is then impeded (for example because of a passivating oxidation layer on the internal Zircaloy surface of the sample tube 10, which layer acts as a diffusion barrier), as is shown in FIG. 2.

Figure 5:
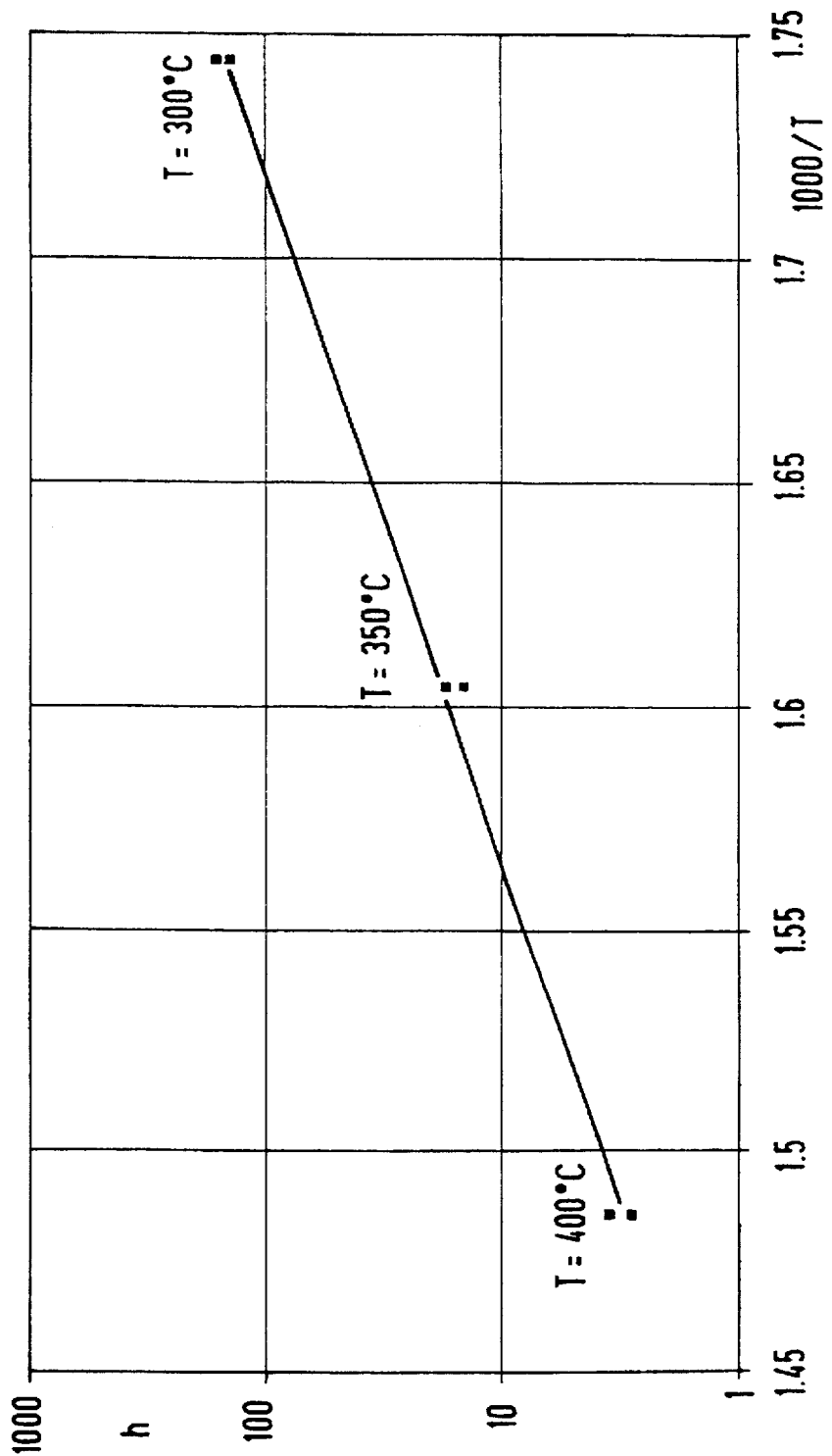
FIG. 5 is a diagram showing a time to a rupture of a cladding as a function of temperature in the case of a production of the damage simulated in FIG. 2.

FIG. 5 shows measured damage times as a function of temperature in a dry $H_2$ atmosphere at normal pressure. At 300° C., a leak occurs only after approximately 150 hours, but at 400° C., it occurs even after approximately 3 hours.

In this connection, the examination of the corrosion layers shows that the hydrogenation of the Zircaloy progresses to such an extent that the material structure is dissolved until the material decomposes.

FIGS. 6 to 9 show various stages in the production of primary and secondary damage, which illustrate a concept of a model for the damage mechanism. Without allowing for actual size relationships, these figures diagrammatically show the cladding tube 1 and the column of pellets 5 of a fuel assembly, which is filled with helium at a pressure of approximately 5 bar in the cold, freshly manufactured state. In the boiling-water reactor, this tube is surrounded by cooling water at approximately 70 bar.

Figure 6:
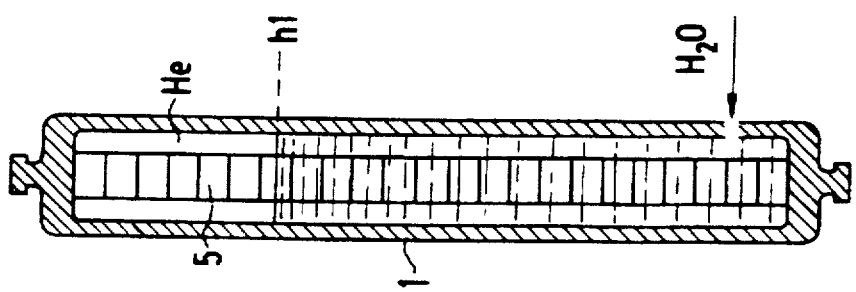

During their production, fuel rods are inspected very closely. For the purpose of better illustration, let it be assumed that primary damage W in the form of a small opening has arisen in the lower part of the fuel rod even after a short operating time, and that cooling water flows into the interior of the fuel rod through that damage. This results in a pressure equalization during which the helium in the fuel rod is compressed to a low volume above a water level h1 in the interior (FIG. 6).

Figure 7:
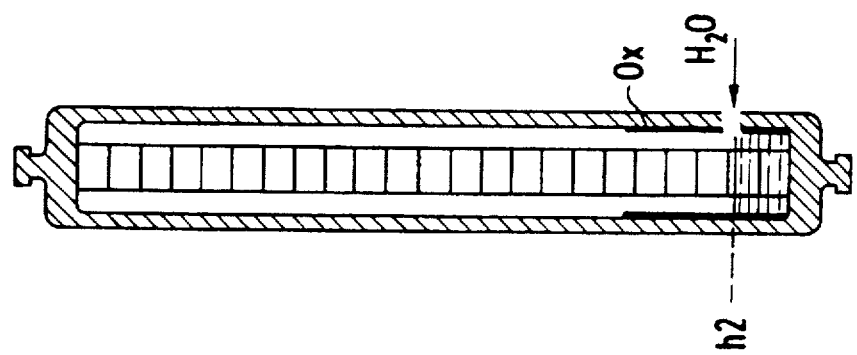
FIGS. 6 to 9 are longitudinal-sectional views showing an effect of primary damage in a fuel rod according to the prior art.

The water which has penetrated reacts both with the fuel and with the cladding-tube material and releases hydrogen due to corrosion. The latter rises in the fuel rod and the water level sinks to a level h2 (FIG. 7). In the upper region of the interior, that results in an increasingly drier atmosphere. Water vapor can only be supplied subsequently from the base of the interior at which the water that has penetrated collects, with the result that an oxide layer Ox forms there on the inside of the tube.

The oxide layer Ox protects the cladding tube against the attack of the hydrogen but hydrogenation of the cladding tube and, finally, secondary damage W', which is assumed in FIG. 8 to be initially just as small and tolerable as the primary damage W, may arise above the oxidation layer in the still not completely dried out central region of the interior, in which hydrogen is continuously supplied subsequently as a result of the oxidation of the fuel.

Figure 9:
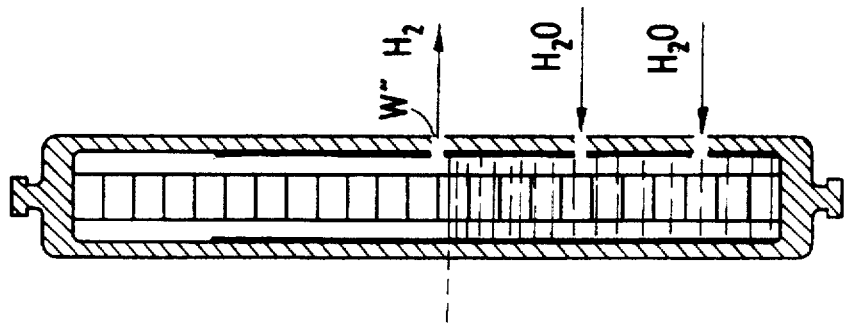

Two openings W and W' are then present and just as much water can flow in subsequently through the opening W as is produced when the increase in volume is allowed for during the formation of the water vapor and the oxidation of the fuel, which escapes as gas through the opening W'. This therefore results in a partial exchange between the gas and a high hydrogen content in the interior and the water vapor produced by the evaporation of the water flowing in subsequently, in which process the water level in the interior rises to a height h3. Starting from this level h3, the process repeats with the formation of an oxidation layer Ox' situated at a higher level and progressive oxidation of the fuel, which process may result in fresh, additional damage W" (FIG. 9).

The reaction of the coolant which enters through the primary damage and has reaction products which attack the cladding-tube material, is regarded, according to the invention, as crucial for the formation of this damage. According to the concepts illustrated in FIGS. 6 to 9, the reaction products of the coolant are, in particular, hydrogen due to oxidation which is produced by the oxidation of the steam with the fuel (the oxidation at the inner surface of the cladding tube is, on the other hand, only of minor importance due to the lower temperature of the tube), and the tube material (which as a rule is Zircaloy, but which is the liner in the case of liner cladding tubes) is attacked by hydrogenation.

The damage process is retarded by the fact that, with progressive oxidation, the tendency of the fuel to oxidize declines and the inner surface of the cladding tube is increasingly protected against hydrogen diffusing in by a slowly growing oxide layer. Under these circumstances, on one hand, the secondary damage W' has the effect of facilitating the exchange between the substantially dry hydrogen atmosphere being formed, which flows out through the damage W' or W''', and vaporized water, on the other hand, which flows in through the primary damage W, with the result that the drying-out of the interior is finally interrupted and/or even reversed. As a result, the oxidation at the cladding-tube wall gains in importance, while its hydrogenation simultaneously decreases in accordance with FIG. 2.

Various effects therefore occur for which mutually competing processes that influence these effects in opposite directions are important. Thus, the drying-out is caused and accelerated by the oxidation of the fuel, but is inhibited by replacement of dry atmosphere with cooling water which penetrates. During the oxidation itself, the fuel competes with the cladding-tube material. The diffusion of the hydrogen into the cladding-tube material and the hydrogenation counteract an oxide layer on the surface. These complicated processes are closely bound to the material properties of the inner surface of the cladding tube. Although cladding tubes having the Zr/0.2 . . . 0.8 Fe liner mentioned (German Utility Model U 92 06 038.2) have not been known for a long time, so that many years of experience with their use in nuclear reactors are not yet available, FIG. 2 makes it clear that a substantially reduced proneness of these cladding tubes to secondary damage is probable. This material, which has a high oxidation resistance to $H_2O$, is, after all, attacked only very slowly by the coolant (water) and its vapor and is also altered only slightly by its reaction products (in particular, the hydrogen due to oxidation), in which connection, the hydrogenation, in particular, only starts to an appreciable extent, as is shown in FIG. 2, when the reaction of the coolant which has penetrated has resulted in a very high concentration of the coreactants being produced (i.e. in a very high partial pressure $p(H_2)$, that is to say a very dry $H_2$ atmosphere). This liner differs in this respect from Zircaloy and, in particular, from liners formed of pure zirconium or other lightly alloyed Zr alloys. In addition, because of its high ductility, the Zr/Fe liner is able to equalize internal stresses which are produced because of the increase in volume that is shown in FIG. 3 and associated with the hydrogenation and which ultimately result in the structure of the cladding tube being destroyed as a consequence of this high concentration of the reaction products (hydrogen due to oxidation).

The role of the hydrogen and of the internal stress which is produced during the hydrogenation as a result of the increase in volume can be explained by a further concept for a model which is based on the property of hydrogen to concentrate on structural disturbances in the material and which is illustrated by reference to FIGS. 10 to 15. Structural disturbances in the material may be foreign bodies, interfaces between different material layers (for example the matrix of the cladding tube and its liner), internal stresses or even external damage such as, for example, scratches or notches in the surface of the tube.

Such structural disturbances then act as a nucleus for secondary damage, with the nucleus being activatable by the hydrogen due to oxidation (which more generally is the reaction products of the coolant) even if the cladding-tube material and the material or the structure of the nucleus is virtually not altered by the coolant itself.

Figure 10:
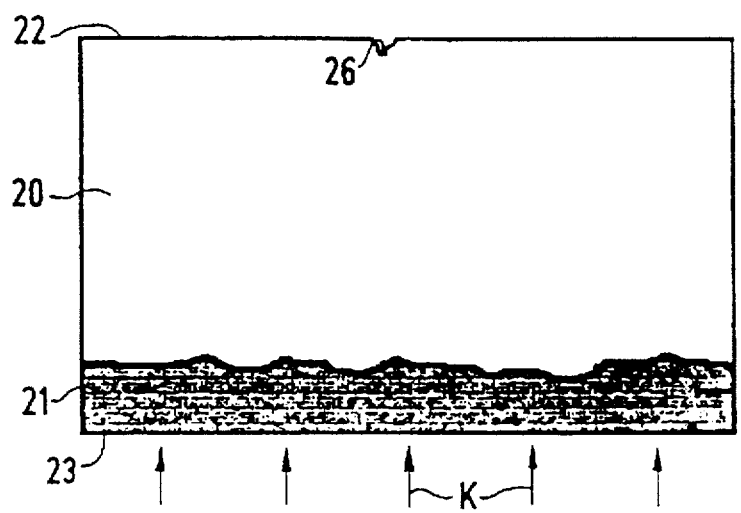
FIGS. 10 to 15 are cross-sectional views through a region of the cladding tube, with various stages in the formation of secondary damage.
Figure 11:
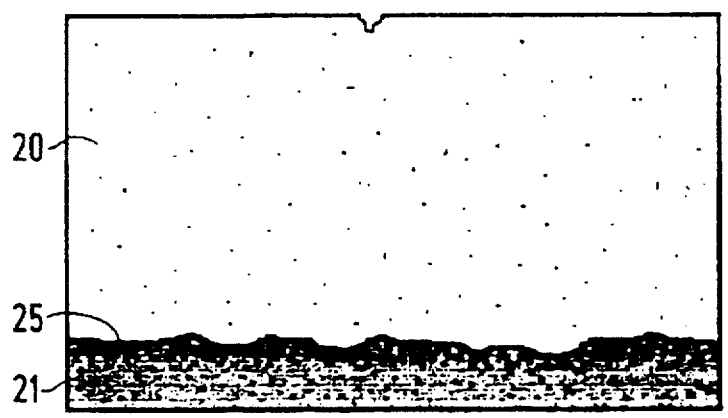
Figure 12:
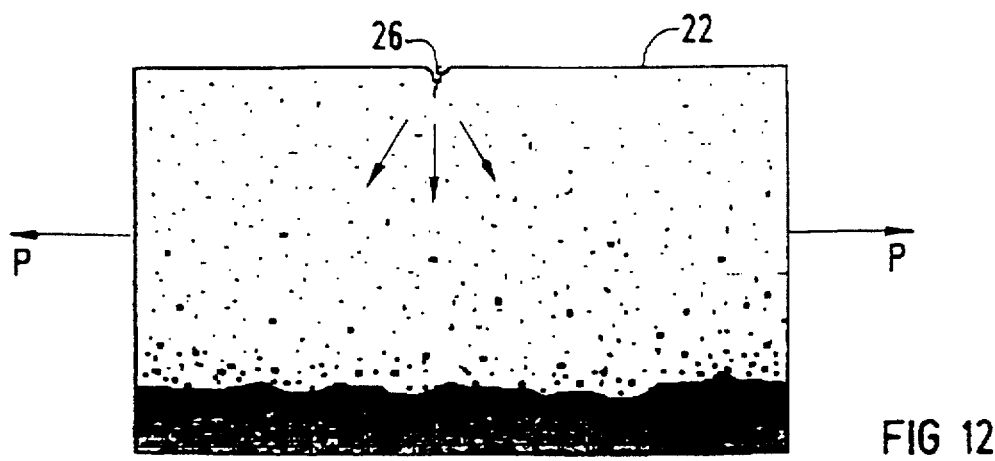
Figure 13:
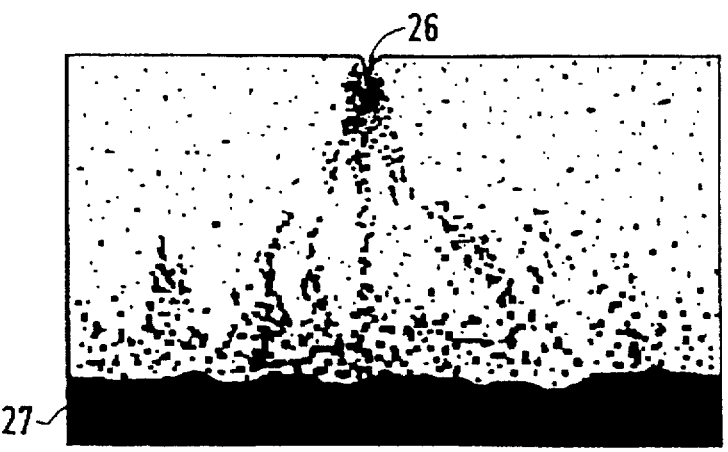

First of all, FIG. 10 shows a portion of a cross section through a test piece which simulates a cladding tube of this type and carries a scratch 26 on a matrix 20 formed of Zircaloy 2 as a nucleus on an outer surface 22 and an internal layer 21 as a liner on an inside 23. The scratch 26 is shown as a notch and acts as a nucleus which is activated by the hydrogen (arrow K) attacking at the inside, as is shown in the subsequent figures.

Hydrogen enters first of all through the inner surface 21 of the tube, as is known from earlier measurements. It results there in an increasing concentration as is shown by the black marks in FIG. 10, and precipitates as hydrides which embrittle the metal. The hydrides, which are shown as black dots in FIG. 11, initially collect mainly in the liner since the boundary layer between the materials of the matrix and of the liner acts as a diffusion barrier for the hydrogen. They bring about an increase in the volume of the material, which manifests itself as tensile stress in the tube, as is indicated by arrows P in FIG. 12. As a result, the tube undergoes a deformation both in the longitudinal direction and in the circumference.

Figure 14:
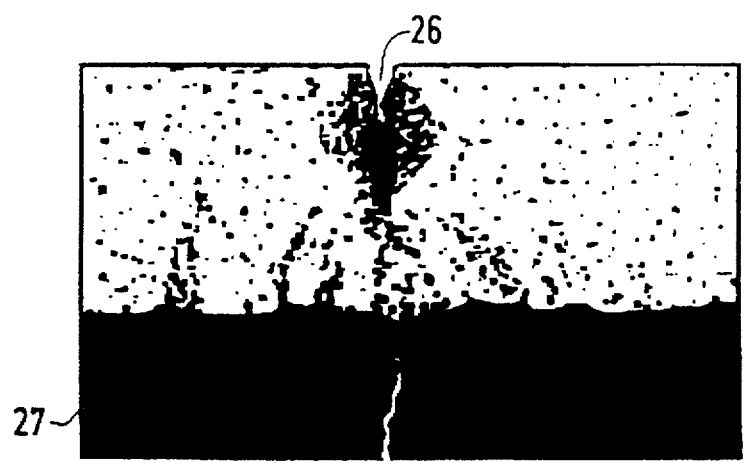
Figure 15:
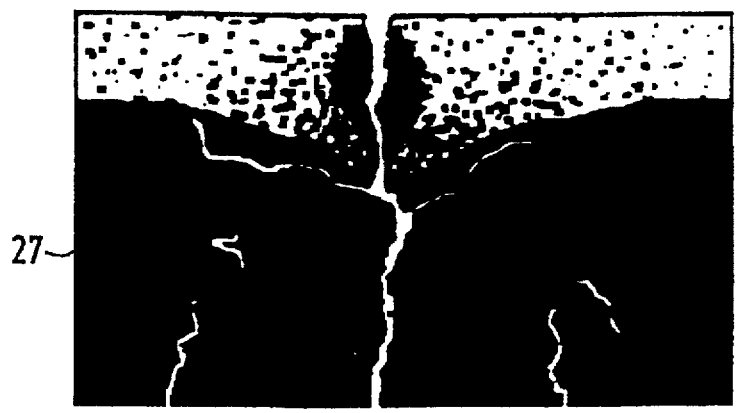

Such stresses, in particular, also attack the structural disturbances mentioned (that is to say, for example, in the notch root of the scratch 26), where denser accumulations of hydride precipitates (FIG. 13) and local embrittlement therefore result. Finally, the tube cracks completely, starting from this point (FIGS. 14 and 15).

Figure 16:
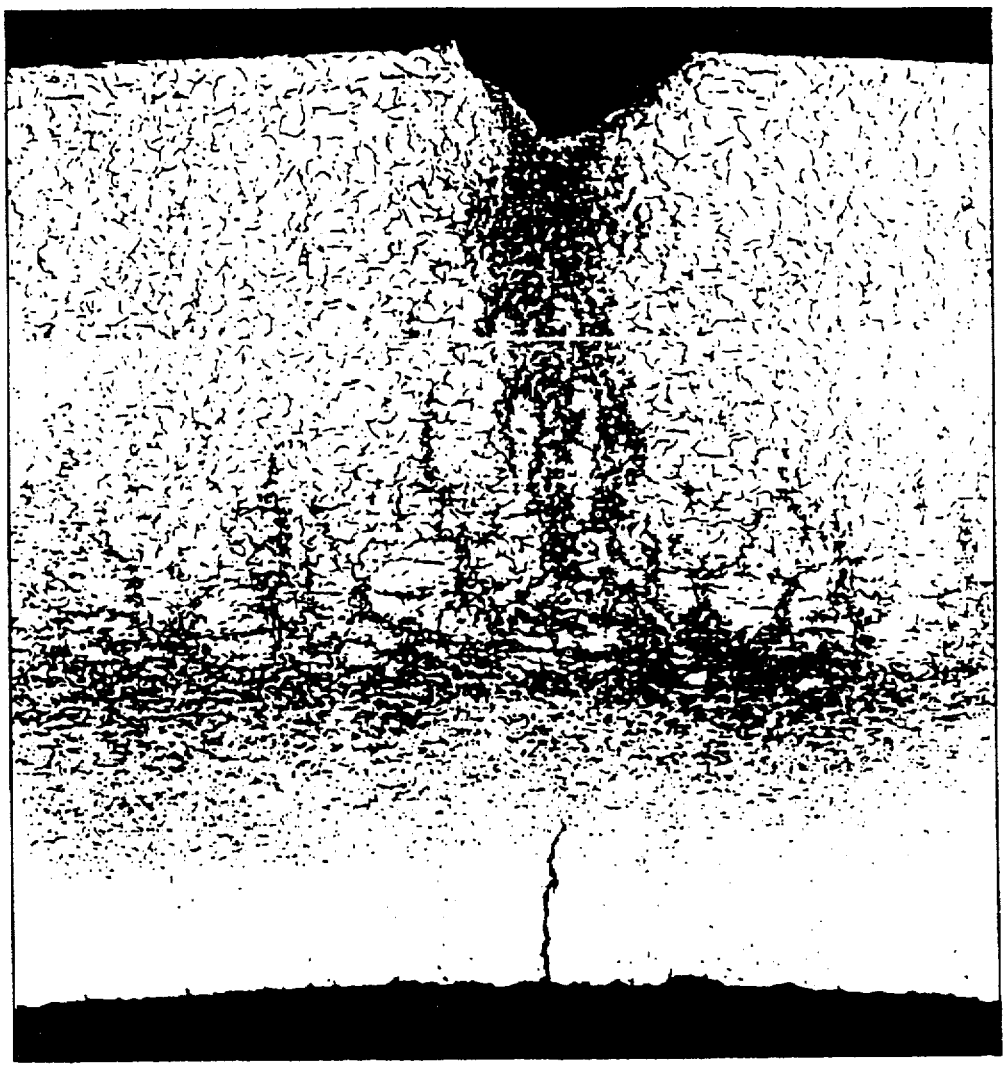
FIG. 16 is a microsection through damage generated in the laboratory test.

This stage is illustrated by the microsection shown in FIG. 16 through a suitable test piece examined in an apparatus constructed in accordance with FIG. 3.

Figure 17:
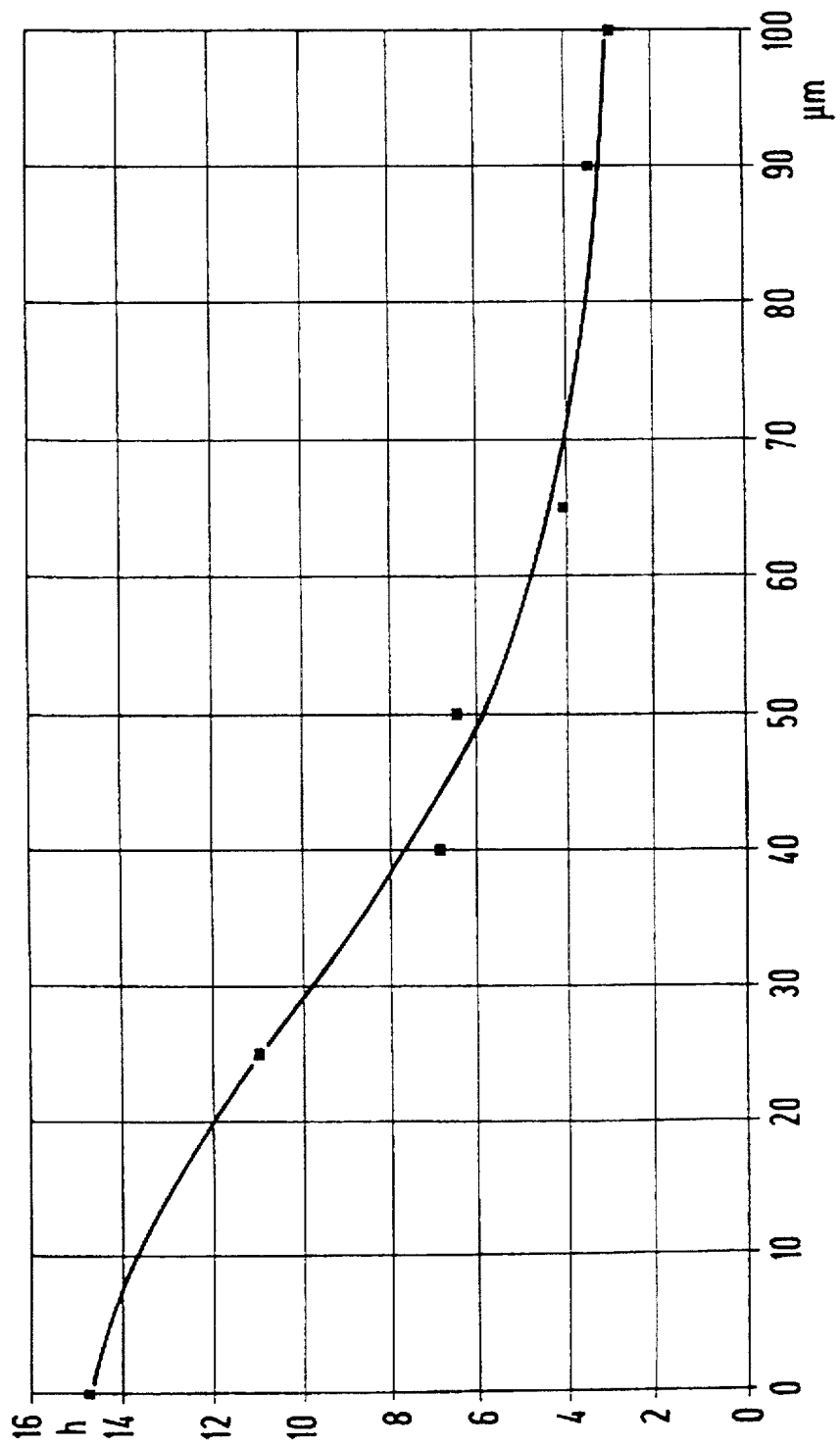
FIG. 17 is a diagram showing the time to the rupture of the cladding in the laboratory test as a function of the depth of a structural defect buried at the outside.

The rapidity with which the crack in the tube occurs increases in proportion with the depth of the original notch. FIG. 17 shows the service life of the test piece at 350° C. as a function of the depth of this structural defect. If the notch extends 100 µm deep into the tube wall from the outer surface of the tube, the wall has cracked at this point after only 3 hours, while it takes approximately 11 hours in the case of a depth of 25 µm. Without visible scratches at the outer surface, a crack develops after approximately 15 hours, for example at any accidental irregularity.

The size of the secondary damage, which was initially assumed to be virtually punctiform in FIGS. 6 to 10 depends, of course, on the extent of the nucleus. If small irregularities are involved, such as those which are unavoidable and which cannot even be discovered during the factory inspection of the fuel rods, the secondary damage is also correspondingly small. If no irregularities at all were present in the matrix, even the interface between the liner and the matrix itself could, finally, act as nucleus.

In this last mentioned case and in the case where the cladding tube has other, extensive nuclei, for example scratches such as those which can be produced during the insertion of the fuel rods into grid-like supporting structures ("spacers") of the fuel assembly, the dreaded long cracks mentioned at the outset or extensive secondary damage are formed. If the fuel rods are inserted into the fuel assemblies with a rotary movement, helical cracks may be produced, as a result of which the helical cracks already illustrated at the outset and observed in isolated cases become explainable.

Figure 8:
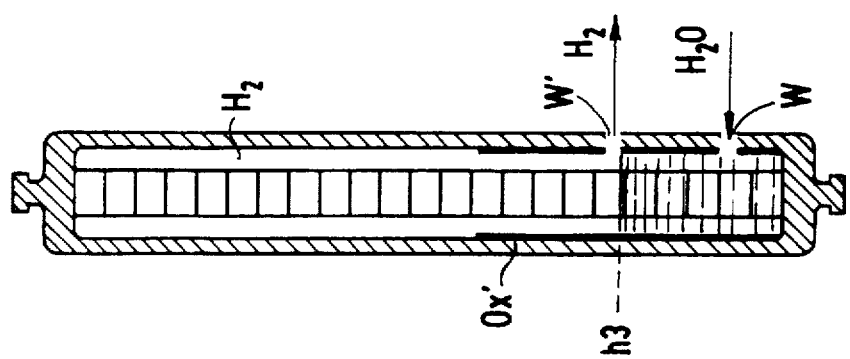

It becomes clear from the description of FIGS. 8 and 9 that small-area secondary damage, which is therefore caused by nuclei of small extent, is scarcely harmful for the operation of the reactor itself and can be tolerated. However, it has an extremely favorable effect on the formation of damage itself since it accelerates the exchange between the dry $H_2$ atmosphere and the vapor of the water which penetrates, that is to say it prevents the drying-out in the interior of the cladding tube. The reaction products of the coolant which has entered therefore cannot reach critical concentrations, i.e. the partial pressure of the hydrogen produced by oxidation does not reach the values which would result, according to FIG. 2, in a rapid hydrogenation of the tube material.

The invention does not then leave it to chance whether insignificant secondary damage occurs or whether the cladding tube is seriously damaged. On the contrary, a nucleus for secondary damage is provided in the cladding tube from the start and deliberately. However, the nucleus is constructed in such a way that it results only in small-area secondary damage and is more easily activated by the reaction product of the coolant, that is to say the hydrogen due to oxidation, than other nuclei which are accidentally and unavoidably present in the cladding tube.

Figure 19:
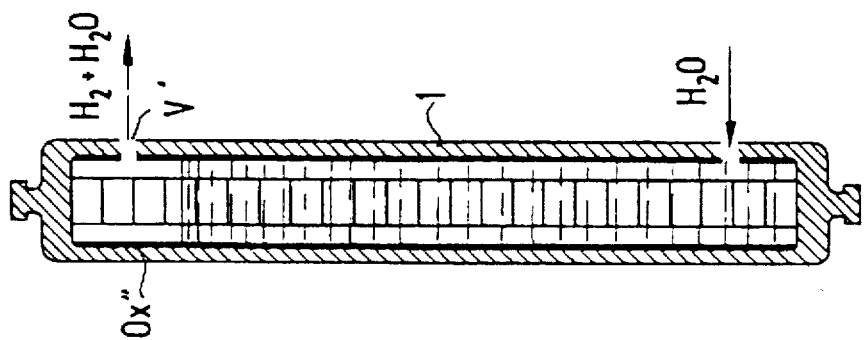
FIGS. 18 and 19 are longitudinal-sectional views showing an effect of a nucleus according to the invention after primary damage.
Figure 18:
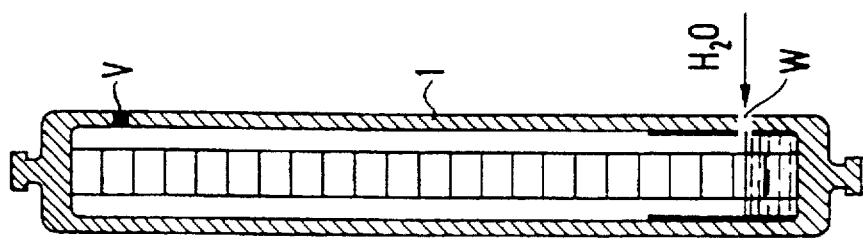

Corresponding to FIG. 6, FIG. 18 shows the cladding tube 1 which is damaged by primary damage W and has an upper section in which a nucleus V is provided. However, the hydrogen which forms in the interior of the cladding tube from the water flowing in through the primary damage W in the manner described by reference to FIG. 7 then results in the nucleus V being activated and resulting in secondary damage V' (FIG. 19) before more extensive secondary damage can develop from other nuclei which are accidentally present. Although the water level in the interior of the cladding tube then rises to a height which results from the equilibrium between the water penetrating through the primary damage W and the hydrogen/cooling steam mixture escaping through the secondary damage V', the internal atmosphere of the coolant does not dry out because of the water continuously being supplied subsequently through the primary damage W, with the result that a protecting oxidation layer Ox" then forms virtually over the entire inner surface of the cladding tube and the dangerous hydrogenation of the cladding material ceases.

Figure 20:
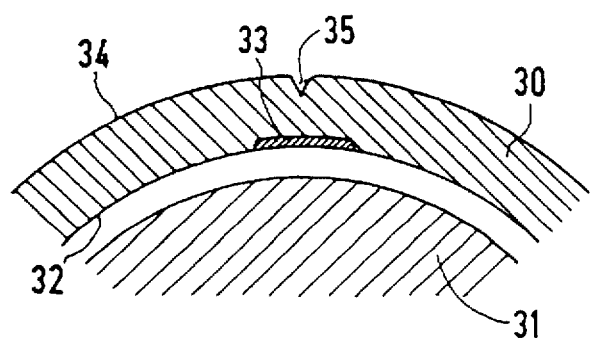
FIGS. 20 to 23 are fragmentary, cross-sectional views through a region of different cladding tubes with different exemplary embodiments of nuclei according to the invention.

FIG. 20 shows a portion of a cladding tube 30 which is filled with a uranium dioxide pellet 31 and which is formed of a homogeneous material, for example Zircaloy. A region 33 is generated on an inner surface 32 of the cladding tube, for example by vapor deposition or sputtering with a suitable foreign substance. In this case coolant (water) or substances due to reaction (hydrogen) which are produced from the coolant after it enters the interior of the cladding tube as a result of reactions with the cladding tube and/or, in particular, as a result of reaction with the fuel, can react with the material of the cladding tube or at least penetrate into the cladding-tube material. If hydrogen due to reaction which is liberated from the water that has penetrated as a result of oxidation is regarded as the cause of the secondary damage, nickel, for example, is a suitable foreign substance since it promotes the absorption of hydrogen, that is to say it acts as a valve for hydrogen which can easily penetrate into zirconium, zirconium alloys and their oxide layers at these points.

The region 33 therefore becomes a channel for the entry of the hydrogen into the cladding-tube material, that is to say the nucleus which can be activated from the interior of the cladding tube.

On an opposite outer surface 34 of the cladding tube, irregularities in the material structure (for example a small notch 35) may result in the hydrogen that is diffused in through the region 33 collecting at the point where the above-mentioned stresses and an embrittlement of the material and, finally, a hole induced by the nucleus, then occur. This process takes place, of course, only after coolant has penetrated into the cladding tube because of primary damage. The normal serviceability of the fuel rod is not disturbed as a result, provided that the cladding tube does not have any primary damage.

At the same time, it is advantageous not only to provide the region 33 as an internally activatable nucleus which then results, at an irregularity of the outer surface of the cladding tube, in a hole corresponding to the irregularity, but, on the contrary, to combine the region 33 with a corresponding region on the outside of the cladding tube which results in stresses in the material of the cladding tube during the operation of the reactor. For example, a structural change deliberately provided in the material or a virtually punctiform or at least small-area notch 35 can be provided at that point on the outer surface of the cladding tube which is situated opposite the region 33.

As FIGS. 10 to 15 suggest, the large-area secondary damage is produced, for example, by extensive notches or scratches on the outer surface of the cladding tube acting as a nucleus which can be activated from the inside of the cladding tube by the coolant or the substances due to reaction produced from the coolant. In order to induce the desired perforation, a suitable nucleus which is also provided only on the outer surface or in the outer surface of the cladding tube may therefore be sufficient. Since, for example, a notch that is deliberately provided, a structural change or a similar nucleus must, however, be more effective than accidental scratches or other unintentional disturbances of the outer surface, it may be necessary to ensure that such nuclei which are disposed only on the outer surface are so pronounced that the integrity of the cladding tube is already endangered thereby without primary damage being present.

Figure 21:
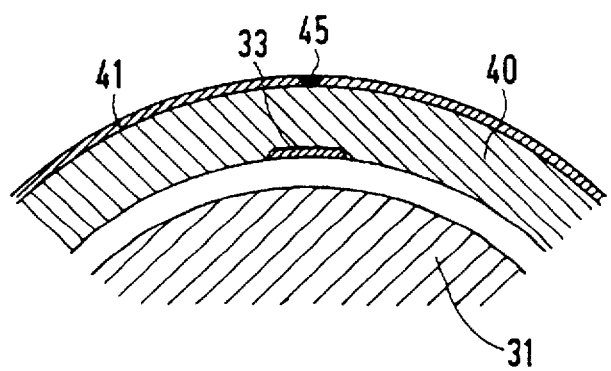

For this reason, it may be more advantageous, as is shown in FIG. 21 on the basis of a cladding tube formed of a Zircaloy matrix and an external lining formed of a zirconium alloy (a so-called "Duplex" cladding tube), to provide a region 45 including another structural change on the outer surface of the cladding tube.

Zirconium, zirconium alloys such as Zircaloy and other cladding-tube materials are generally present relatively homogeneously in the $\alpha$-structure which is stable at low temperature since the cladding tubes are subjected to a corresponding annealing and slow cooling in the course of their manufacture. It is now possible to convert the material into a structure which is stable at higher temperatures, for example a $\beta$-structure, by heating a suitably chosen region (for example, through the use of a laser beam), from which structure a morphological structure which is altered with respect to the remaining cladding-tube material is formed after a quenching process. Therefore, in the example shown in FIG. 21 a region having a "quenched $\beta$-microstructure", that is to say a structure formed by quenching the locally generated $\beta$-phase, has been generated at the outer surface in the cladding-tube material, which otherwise has the $\alpha$-structure.

Consequently, a nucleus which can be supplemented by a region 33 formed as shown in FIG. 20 on the inner surface of the cladding tube is provided on the outside in a way which safeguards the material. The structural changes in the region 45 also act as collecting points for the hydrogen due to reaction which has penetrated and as the starting point of stresses and stress cracks, as was described in regard to FIGS. 10 to 15 on the basis of notches or scratches. However, the cracks only spread to the extent that the surrounding material is embrittled by excessive hydrogenation or damaged in a similar way.

Figure 22:
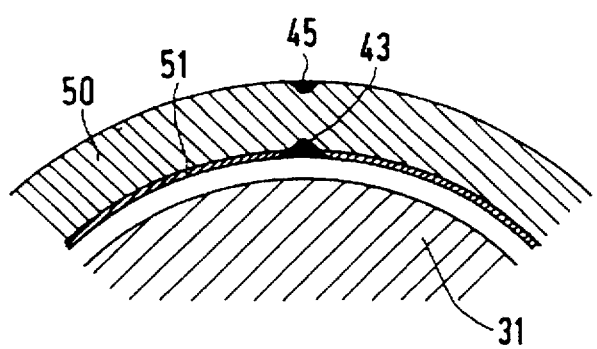

Such a collecting point, which acts as a corrosion nucleus, for hydrogen due to oxidation and a starting point for stresses can, of course, also be generated on the inside by a suitable structural change. FIG. 22 shows this on the basis of an example of a Zircaloy cladding tube having a zirconium liner, with a region 43 on the inside of the cladding tube being generated by reflecting a laser beam inward. As a result of this, it is possible to introduce enough energy, virtually in the form of a point, for the structural change even to pass through a liner 51 and extend into a matrix 50. The interface between the matrix which forms one surface of the cladding tube and the material which is applied to the matrix and forms a thin layer on the other surface of the tube therefore contains a region which is more permeable to substances due to reaction that are formed after the coolant enters the interior of the cladding tube than the remaining interface between these different materials.

Such structures have the advantage of not damaging the mechanical integrity of the cladding tube and virtually not impairing the corrosion resistance during normal operation either.

Figure 23:
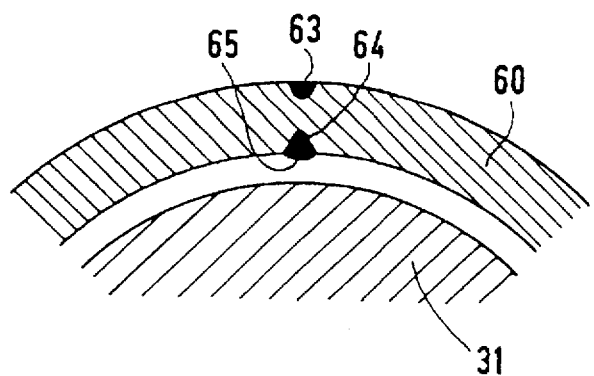

These and similar ways of forming the nuclei according to the invention can also be combined with one another. Thus, for example, FIG. 23 shows a cladding tube formed of a homogeneous zirconium alloy having an α-structure. In this case the cladding tube has regions 63 and 64 with an altered microstructure being provided in each of the outside and at an opposite point on the inside of the cladding tube, with a thin coating 65 formed of nickel additionally being applied to the inside of the cladding tube on top of the region 64 situated on the inside of the cladding tube.

Figure 24:
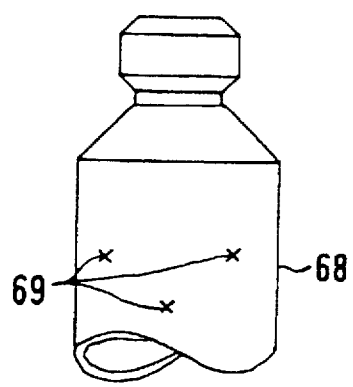
FIG. 24 is an enlarged, fragmentary, elevational view of an upper end cap of an exemplary embodiment of the invention.

FIG. 24 shows a diagrammatic side view of an upper end of the fuel rod 68, on which a plurality of cross-type nuclei 69 are distributed at a relatively small distance below the end of the fuel-rod.

The length of such cross-type or line-type nuclei provided on the inner surface and/or outer surface is advantageously very small, for example less than 2 mm. Generally, the geometry of the nucleus which, of course, also determines the shape of the hole induced thereby, is chosen in such a way that no holes are produced thereby which are so large or so disadvantageous that they permanently disturb the further serviceability of the fuel rod and make a rapid replacement necessary. On the contrary, after its activation, the nucleus should result in a hole which produces as little disturbance as possible. Advantageously, it is provided near the upper end of the fuel rod, in particular in the upper fifth of the fuel rod. In this connection, a certain minimum distance from welding seams or other weak points in the fuel rod is expedient.

In the case of boiling-water reactors, absorbers for controlling a frequently varying power requirement are subjected to a frequent movement. Such frequent power changes result in heavy thermal and mechanical loadings of the cladding tube. The invention is therefore particularly important, first of all, for fuel rods of boiling-water reactors in order to reliably avoid severe secondary damage. In this connection, the correct choice of the material for the inner wall of the cladding tube acquires particular importance.

FIG. 2 shows that the material of the liner cannot be selected solely with regard to ductility and corrosion resistance. It was precisely cladding tubes having pure-zirconium liners which exhibited the longest cracks. Crucially, a high resistance to hydrogen must be added.

The primary damage is largely avoided by the use of a suitable liner. However, primary damage, which is generated on the outside of the cladding tube and results in holes that grow through the cladding tube from the outside inward, is also unaffected by the liner. In this case the "automatic hydrogen safety valve" according to the invention offers additional protection against large-area secondary damage.

The nucleus provided according to the invention for the controlled formation of small-area secondary damage does not impair the serviceability of a fuel rod at all, provided a primary defect has not yet occurred. After primary damage, which would, in unfavorable cases, result in serious secondary damage within a short time, susceptibility to secondary damage is controlled and results only in small-area damage that does not yet require a rapid replacement of the fuel rod but makes it possible to leave it, under certain circumstances, for an even longer time in the reactor core.

In addition, however, the invention can also be applied in the case of other cladding tubes, for example for fuel rods of pressurized-water reactors.

We claim:

1. A fuel rod for a boiling-water fuel assembly, comprising a sealed cladding tube including:
   a) a water-free interior containing at least oxidizable nuclear fuel;
   b) a cladding-tube wall having an inner surface formed of a metallurgically applied metal, said metal being corrosion-resistant to conditions in said interior during operation of a reactor and stable against change even in the presence of hydrogen;
   c) an outer surface being formed of a material being corrosion-resistant to conditions in boiling water during operation of the reactor; and
   d) a chemically activatable nucleus for forming a hole penetrating said cladding tube, said nucleus being activatable by gaseous hydrogen.

2. The fuel rod according to claim 1, wherein said cladding tube is formed of Zircaloy and said metallurgically applied metal is essentially formed of a zirconium/iron alloy.

3. A fuel rod for a fuel assembly being cooled by a coolant including light water, during operation of a light-water nuclear reactor, comprising a sealed cladding tube including:
   a) a substantially light-water-free interior containing at least nuclear fuel;
   b) an inner surface being formed of a material being corrosion-resistant to conditions in said interior during operation of a reactor;
   c) an outer surface being formed of a material being corrosion-resistant to conditions in the coolant during operation of the reactor; and
   d) a chemically activatable nucleus for forming a hole penetrating said cladding tube, said nucleus not being activatable from outside by the coolant and from inside by conditions in said interior with an undamaged cladding tube and under operating conditions of the nuclear reactor, but being activatable by an atmosphere which develops after the coolant has entered said interior of said cladding tube through damage to said cladding tube.

4. The fuel rod according to claim 3, wherein said nucleus has an area less than 4 $mm^2$.

5. The fuel rod according to claim 3, including upper and lower fuel-rod ends, said nucleus being disposed near one of said fuel-rod ends.

6. The fuel rod according to claim 3, including upper and lower fifths of the fuel rod, said nucleus being disposed in one of said fifths.

7. The fuel rod according to claim 3, including a fuel-rod section not containing any fuel, said nucleus being disposed in said section.

8. The fuel rod according to claim 3, including upper and lower fuel-rod ends, and at least one other nucleus, at least one of said nuclei being disposed in each of said upper and lower fuel-rod ends.

9. The fuel rod according to claim 3, wherein said nucleus has a geometric shape resulting, after its activation, in a hole, and said hole does not substantially impair the operation of the reactor.

10. The fuel rod according to claim 9, wherein said nucleus is substantially punctiform.

11. The fuel rod according to claim 9, wherein said nucleus has a small area in relationship to a surface area of said cladding tube.

12. The fuel rod according to claim 9, wherein said nucleus has a longest extent being less than approximately 2 mm.

13. The fuel rod according to claim 9, wherein said nucleus has a line-type cross section and is disposed on at least one of said inner and outer surfaces of said cladding tube.

14. The fuel rod according to claim 9, wherein said nucleus has a cross-type cross section and is disposed on at least one of said inner and outer surfaces of said cladding tube.

15. The fuel rod according to claim 3, wherein said nucleus contains a region having a structure being altered as compared with a structure of said material on said inner surface of said cladding tube, and said region is disposed on an inside of said cladding tube.

16. The fuel rod according to claim 15, wherein said material on said inner surface of said cladding tube has an α-structure and said material in said region of said nucleus disposed on said inside has a quenched β-structure.

17. The fuel rod according to claim 3, wherein said nucleus contains a region in which a material is applied to an inside of said cladding tube, and said material makes said cladding tube capable of absorbing or reacting with the coolant or substances due to reaction occurring after the coolant has entered said interior of said cladding tube.

18. The fuel rod according to claim 3, wherein said nucleus contains a region on said outer surface of said cladding tube generating stresses in a material of said cladding tube during the operation of the reactor.

19. The fuel rod according to claim 3, wherein said nucleus contains a region on said outer surface of said cladding tube being embrittled by substances due to reaction occurring after the coolant has entered said interior of said cladding tube and diffused through a cladding-tube wall.

20. The fuel rod according to claim 3, wherein said nucleus contains an α-structure of said material on said outer surface of said cladding tube and a quenched β-structure of a material in a region disposed on an outside of said cladding tube.

21. The fuel rod according to claim 15, wherein said nucleus contains a region on said outer surface of said cladding tube generating stresses in a material of said cladding tube during the operation of the reactor, and said region on said inner surface of said cladding tube and said region on said outer surface of said cladding tube are disposed approximately opposite one another on a cladding-tube wall.

22. The fuel rod according to claim 15, wherein said nucleus contains a region on said outer surface of said cladding tube being embrittled by substances due to reaction occurring after the coolant has entered said interior of said cladding tube and diffused through a cladding-tube wall, and said region on said inner surface of said cladding tube and said region on said outer surface of said cladding tube are disposed approximately opposite one another on a cladding-tube wall.

23. The fuel rod according to claim 16, wherein said nucleus contains a region on said outer surface of said cladding tube generating stresses in a material of said cladding tube during the operation of the reactor, and said region on said inner surface of said cladding tube and said region on said outer surface of said cladding tube are disposed approximately opposite one another on a cladding-tube wall.

24. The fuel rod according to claim 16, wherein said nucleus contains a region on said outer surface of said cladding tube being embrittled by substances due to reaction occurring after the coolant has entered said interior of said cladding tube and diffused through a cladding-tube wall, and said region on said inner surface of said cladding tube and said region on said outer surface of said cladding tube are disposed approximately opposite one another on a cladding-tube wall.

25. The fuel rod according to claim 17, wherein said nucleus contains a region on said outer surface of said cladding tube generating stresses in a material of said cladding tube during the operation of the reactor, and said region on said inner surface of said cladding tube and said region on said outer surface of said cladding tube are disposed approximately opposite one another on a cladding-tube wall.

26. The fuel rod according to claim 17, wherein said nucleus contains a region on said outer surface of said cladding tube being embrittled by substances due to reaction occurring after the coolant has entered said interior of said cladding tube and diffused through a cladding-tube wall, and said region on said inner surface of said cladding tube and said region on said outer surface of said cladding tube are disposed approximately opposite one another on a cladding-tube wall.

27. The fuel rod according to claim 3, wherein said outer surface of said cladding tube is made of a material being resistant to the coolant and said inner surface of said cladding tube is made of another material.

28. The fuel rod according to claim 27, wherein said inner surface is formed of a more ductile material than said outer surface.

29. The fuel rod according to claim 27, wherein said nucleus contains a region at an interface between said material of said outer surface and said material of said inner surface, and said region is more permeable to or more capable of absorbing substances due to reaction being produced when the coolant enters said interior of said cladding tube than said interface between said materials.

30. The fuel rod according to claim 3, wherein said interior of said cladding tube contains an oxidizable fuel, said outer surface of said cladding tube is formed from a material being resistant to corrosion by water as the coolant, an inner layer is formed from a material being resistant to loadings being produced at said inner surface during the operation of the reactor, and said nucleus has a region which is disposed on or in said inner surface and which has a high absorption capability for hydrogen.

31. The fuel rod according to claim 30, wherein said cladding tube has a wall with a given thickness and a carrier layer being formed of a zirconium alloy extending at least over more than half of said given thickness.

32. The fuel rod according to claim 31, wherein said zirconium alloy is Zircaloy.

33. The fuel rod according to claim 31, including a layer being formed of another zirconium alloy and being applied to said carrier layer.

34. The fuel rod according to claim 33, wherein said layer being formed of another zirconium alloy is formed of a purer zirconium alloy than said alloy of said carrier layer.

35. The fuel rod according to claim 33, wherein a material applied to said carrier layer forms said inner surface of said cladding tube at least outside said nucleus.

36. The fuel rod according to claim 30, wherein said nucleus on at least one of an inside and an outside of said cladding tube contains a region having a quenched β-microstructure.

37. The fuel rod according to claim 36, wherein said cladding tube has a wall with sides, said cladding tube contains two regions each having said quenched β-microstructure on a respective one of said sides of said wall, and said two regions are disposed approximately opposite one another.

38. The fuel rod according to claim 30, wherein said region disposed on said inner surface is formed from a material having a high storage capacity for hydrogen, and including another material having a high permeability to hydrogen being applied to said material having a high storage capacity for hydrogen.

* * * * *